(12) United States Patent
Jiang

(10) Patent No.: US 12,176,546 B2
(45) Date of Patent: *Dec. 24, 2024

(54) BATTERY INCLUDING CURRENT COLLECTOR TAIL STRUCTURE

(71) Applicant: NINGDE AMPEREX TECHNOLOGY LIMITED, Ningde (CN)

(72) Inventor: Jing Jiang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,778

(22) Filed: Apr. 10, 2023

(65) Prior Publication Data

US 2023/0253570 A1 Aug. 10, 2023

Related U.S. Application Data

(63) Continuation of application No. 16/829,988, filed on Mar. 25, 2020, now Pat. No. 11,652,212, which is a
(Continued)

(51) Int. Cl.
*H01M 4/78* (2006.01)
*H01M 4/66* (2006.01)
(Continued)

(52) U.S. Cl.
CPC ............ *H01M 4/78* (2013.01); *H01M 4/661* (2013.01); *H01M 10/0525* (2013.01);
(Continued)

(58) Field of Classification Search
CPC .......... H01M 4/78; H01M 4/66; H01M 50/20; H01M 50/30; H01M 10/0525
See application file for complete search history.

(56) References Cited

U.S. PATENT DOCUMENTS

2008/0233474 A1 9/2008 Son et al.
2009/0220863 A1 9/2009 Kimura
(Continued)

FOREIGN PATENT DOCUMENTS

CN 202495507 U 10/2012
CN 203150653 U 8/2013
(Continued)

OTHER PUBLICATIONS

Ningde Amperex Technology Limited, Examination Report, IN202027012878, Dec. 2, 2020, 6 pgs.
(Continued)

*Primary Examiner* — Kenneth J Douyette
(74) *Attorney, Agent, or Firm* — Morgan, Lewis & Bockius LLP

(57) ABSTRACT

A cell includes a first current collector and a second current collector. A tail end of the first current collector exceeds a tail end of the second current collector by at least half a circle in a winding direction. The tail end of the first current collector does not include an active material and is bonded on an outer peripheral surface of an outermost circle of the first current collector by a first adhesive, the first adhesive is a double-sided tape or a hot melt adhesive. The cell is bonded with another double-sided tape or another hot melt adhesive on a side opposite from the tail end of the first current collector.

18 Claims, 12 Drawing Sheets

Related U.S. Application Data continuation of application No. PCT/CN2018/078128, filed on Mar. 6, 2018.

(51) Int. Cl.
   *H01M 10/0525* (2010.01)
   *H01M 10/0587* (2010.01)
   *H01M 50/40* (2021.01)
   *H01M 50/46* (2021.01)
   *H01M 50/531* (2021.01)
   *H01M 50/595* (2021.01)
   *H01M 50/586* (2021.01)

(52) U.S. Cl.
   CPC ....... *H01M 10/0587* (2013.01); *H01M 50/40* (2021.01); *H01M 50/46* (2021.01); *H01M 50/531* (2021.01); *H01M 50/595* (2021.01); *H01M 50/586* (2021.01)

(56) References Cited

U.S. PATENT DOCUMENTS

| | | | |
|---|---|---|---|
| 2009/0297929 A1 | 12/2009 | Uchida | |
| 2016/0380299 A1 | 12/2016 | Umeyama et al. | |
| 2017/0170508 A1* | 6/2017 | Zhu | H01M 4/13 |
| 2017/0338510 A1 | 11/2017 | Zhu et al. | |
| 2017/0346130 A1 | 11/2017 | Maeda et al. | |
| 2018/0034109 A1 | 2/2018 | Wang et al. | |

FOREIGN PATENT DOCUMENTS

| | | |
|---|---|---|
| CN | 205376669 U | 7/2016 |
| CN | 206040883 U | 3/2017 |
| CN | 206697567 U | 12/2017 |
| CN | 206834277 | 1/2018 |
| CN | 206878126 U | 1/2018 |
| EP | 3518315 A1 | 7/2019 |
| JP | 2003051339 A | 2/2003 |
| JP | 2005116186 A | 4/2005 |
| JP | 2006260904 A | 9/2006 |
| JP | 2006278142 A | 10/2006 |
| JP | 2007172975 A | 7/2007 |
| JP | 2009289570 A | 12/2009 |
| JP | 5128769 B2 | 1/2013 |
| KR | 20170085053 A | 7/2017 |
| WO | WO2016080143 A1 | 5/2016 |

OTHER PUBLICATIONS

Jiang, Non-Final Office Action, U.S. Appl. No. 16/829,988, Apr. 1, 2022, 19 pgs.

Jiang, Final Office Action, U.S. Appl. No. 16/829,988, Aug. 9, 2022, 19 pgs.

Ningde Amperex Technology Limited, International Search Report and Written Opinion, PCT/CN2018/078128, Oct. 10, 2018, 12 pgs.

Ningde Amperex Technology Limited, Office Action, CN201820308882.1, Aug. 1, 2018, 2 pgs.

Ningde Amperex Technology Limited, Extended European Search Report, EP18908778.6, Dec. 8, 2021, 8 pgs.

Ningde Amperex Technology Limited, Notice of Reasons for Refusal, JP2020-518486, Jun. 1, 2021, 12 pgs.

Ningde Amperex Technology Limited, Notice of Reasons for Refusal, JP2020-518486, Feb. 8, 2022, 14 pgs.

Ningde Amperex Technology Limited, Request for the Submisson of an Opinion, KR10 2020-7008850, Sep. 27, 2021, 17 pgs.

Ningde Amperex Technology Limited, Request for the Submisson of an Opinion, KR10-2020-7008850, Mar. 8, 2022, 18 pgs.

* cited by examiner

BATTERY INCLUDING CURRENT COLLECTOR TAIL STRUCTURE

CROSS-REFERENCE TO RELATED APPLICATION

The present application is a continuation application of U.S. patent application Ser. No. 16/829,988, now U.S. Pat. No. 11,652,212, filed on Mar. 25, 2020, which is a national phase entry of International Application PCT/CN2018/078128 filed on Mar. 6, 2018, the entire disclosures of which are incorporated herein by reference.

FIELD

The present disclosure relates to a technical field of batteries, and more particularly, to a cell.

BACKGROUND

In the related art, lithium-ion battery abuse easily causes failure, especially in the case of dropping, and safety accidents occur. In order to improve the drop failure performance, a measure that strengthens fixation between a bare cell and a packaging bag by a double-sided tape or a hot melt adhesive or the like are usually adopted, which can reduce movement and collision of the bare cell. However, this measure easily causes a finishing bare aluminum foil to be torn, because there is a bare foil or single-sided region in the outermost circle and weak friction between layers is likely to cause displacement and tears, which may further lead to short circuits.

SUMMARY

The present disclosure aims to solve at least one of the technical problems existing in the related art. To this end, the present disclosure proposes a cell that may effectively avoid short circuits.

The cell according to the present disclosure includes: a first current collector and a second current collector. Along a winding direction, a tail end of the first current collector exceeds a tail end of the second current collector by at least half a circle.

The inventor of the present application finds that after the length of the first current collector is increased and the tail end of the first current collector exceeds the tail end of the second current collector by at least half a circle, the following situation will occur: the outermost circle of the cell is the first current collector, a secondary outer circle of the cell is still the first current collector, and the next secondary outer circle of the cell is the second current collector, such that both the outermost circle and the secondary outer circle of the cell are the first current collector. In such a way, even if the tail end of the first current collector is torn, no short circuit occurs when the outermost circle and the secondary outer circle of the cell are in contact with each other, in which the contact is essentially between the same polarities.

In some embodiments of the present disclosure, the tail end of the first current collector exceeds the tail end of the second current collector by half a circle to by one circle.

In some embodiments of the present disclosure, the tail end of the first current collector abuts on an outer peripheral surface of the secondary outer circle of the first current collector In some embodiments of the present disclosure, the cell further includes: a separator spaced between the first current collector and the second current collector. Along the winding direction, a tail end of the separator is located between the tail end of the first current collector and the tail end of the second current collector.

In some embodiments of the present disclosure, the tail end of the first current collector exceeds the tail end of the separator by at least half a cycle.

In some embodiments of the present disclosure, the cell further includes: a first straight segment, a first bent segment, a second straight segment, and a second bent segment. The tail end of the first current collector is located on the first straight segment or the second straight segment.

In some embodiments of the present disclosure, the tail end of the first current collector and the tail end of the second current collector are both located on the first straight segment or the second straight segment.

In some embodiments of the present disclosure, the tail end of the first current collector is located on the first straight segment or the second straight segment, the tail end of the second current collector is located on the first straight segment or the second straight segment, and the tail end of the first current collector and the tail end of the second current collector are located on both sides of the cell respectively.

In some embodiments of the present disclosure, the first current collector includes: a first active material layer section, a first bare foil section and a finishing section that are successively connected. A surface of the first bare foil section is not provided with a first active material layer, a surface of the first active material layer section is provided with the first active material layer, and the finishing section has a length of at least half a circle. The second current collector includes: a second active material layer section and a second bare foil section that are successively connected. A surface of the second active material layer section is provided with a second active material layer, and a surface of the second bare foil section is not provided with the second active material layer. The cell includes an opposite region of the bare foil sections. In the opposite region of the bare foil sections, a partial area of the first bare foil section and the second bare foil section face each other.

In some embodiments of the present disclosure, the opposite region of the first bare foil section has a length of half a circle to one circle.

In some embodiments of the present disclosure, the first current collector includes: a first active material layer section and a finishing section that are successively connected. A surface of the first active material layer section is provided with an active material layer, and the finishing section has a length of at least half a circle. A surface of the second current collector is provided with an active material layer, and the active material layer extends to the tail end of the second current collector.

In some embodiments of the present disclosure, along the winding direction, on the first current collector, a region from a starting end of the first current collector to a first bend where the first current collector is bent for the first time is a starting section of the first current collector. Along a direction opposite to the winding direction, on the second current collector, a region from the tail end of the second current collector to an initial bend where the second current collector is bent initially is an outer circle straight section of the second current collector. Projections of the starting section of the first current collector and the outer circle straight section of the second current collector on the horizontal plane do not overlap.

In some embodiments of the present disclosure, the tail end of the first current collector is bonded on an outer peripheral surface of the outermost circle of the first current collector by a first adhesive.

In some embodiments of the present disclosure, the first adhesive is at least one of a single-sided tape, a double-sided tape, and a hot melt adhesive.

In some embodiments of the present disclosure, the first adhesive is a double-sided tape or a hot melt adhesive, and the first adhesive is also used to bond a packaging bag.

In some embodiments of the present disclosure, the first adhesive is a single-sided tape, the cell is bonded with a double-sided tape or a hot melt adhesive on the other side away from the tail end of the first current collector, and the double-sided tape or the hot melt adhesive is also used to bond a packaging bag.

In some embodiments of the present disclosure, the first adhesive also bends and extends to the other side away from the tail end of the first current collector.

In some embodiments of the present disclosure, the cell further includes: a first electrode tab and a second electrode tab. The first electrode tab is electrically connected with the first current collector, and the second electrode tab is electrically connected with the second current collector. Projections of the first electrode tab and the first adhesive on the horizontal plane do not overlap, or projections of the second electrode tab and the first adhesive on the horizontal plane do not overlap.

In some embodiments of the present disclosure, the first current collector is a cathode current collector, and the second current collector is an anode current collector. The material of a main body of the first current collector is aluminum, and the material of a main body of the second current collector is copper.

In some embodiments of the present disclosure, the first current collector is an anode current collector, and the second current collector is a cathode current collector. The material of a main body of the first current collector is copper, and the material of a main body of the second current collector is aluminum.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and/or other aspects and advantages of the present disclosure will become apparent and readily appreciated from the following descriptions of embodiments with reference to the drawings, in which.

DETAILED DESCRIPTION

Figure 1:
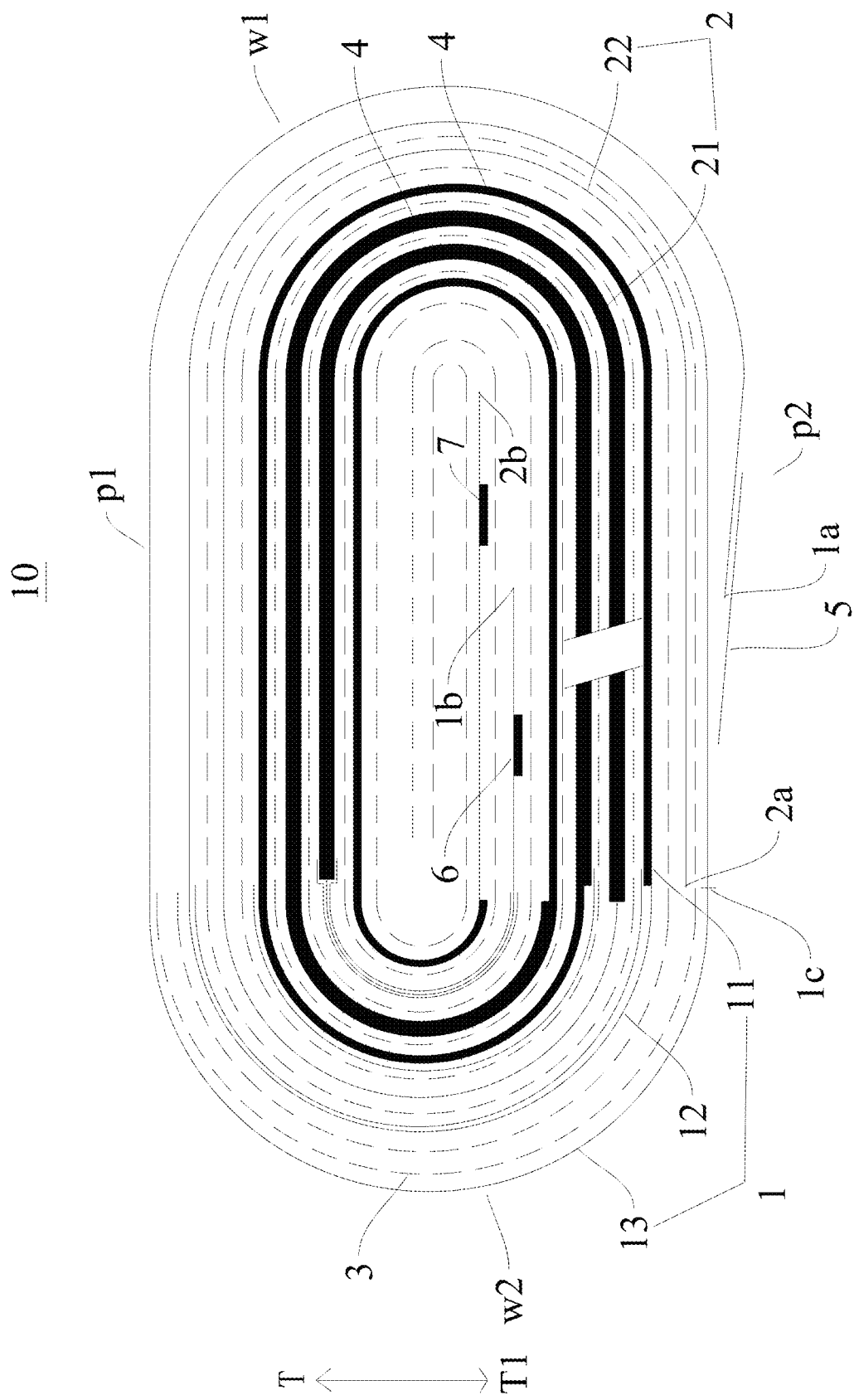
FIG. 1 illustrates a schematic view of a cell according to a first embodiment of the present disclosure.

Embodiments of the present disclosure will be described in detail below, and examples of the embodiments will be illustrated in the accompanying drawings. The same or similar reference numerals represent the same or similar elements or the elements having the same or similar functions throughout the description. The embodiments described below with reference to the accompanying drawings are exemplary, are merely used to explain the present disclosure, and cannot be construed to limit the present disclosure.

In the description of the present disclosure, it should be understood that terms such as "central," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," "circumferential" and the like should be construed to refer to the orientation as then described or as shown in the drawings under discussion. These terms are for convenience and simplification of description and do not indicate or imply that the device or element referred to must have a particular orientation, or be constructed and operated in a particular orientation, so these terms shall not be construed to limit the present disclosure. In addition, the feature defined with "first" and "second" may comprise one or more of this feature. In the description of the present disclosure, "a plurality of" means two or more than two, unless specified otherwise.

In the present disclosure, it should be noted, unless specified or limited otherwise, the terms "mounted," "connected," "coupled" or the like are used broadly. The terms may be, for example, fixed connections, detachable connections, or integral connections; may also be mechanical or electrical connections, may also be direct connections or indirect connections via intervening structures; and may also be inner communications of two elements, which can be understood by those skilled in the art according to specific situations.

The cell according to embodiments of the present disclosure will be described in detail below with reference to FIGS. 1-12.

Figure 2:
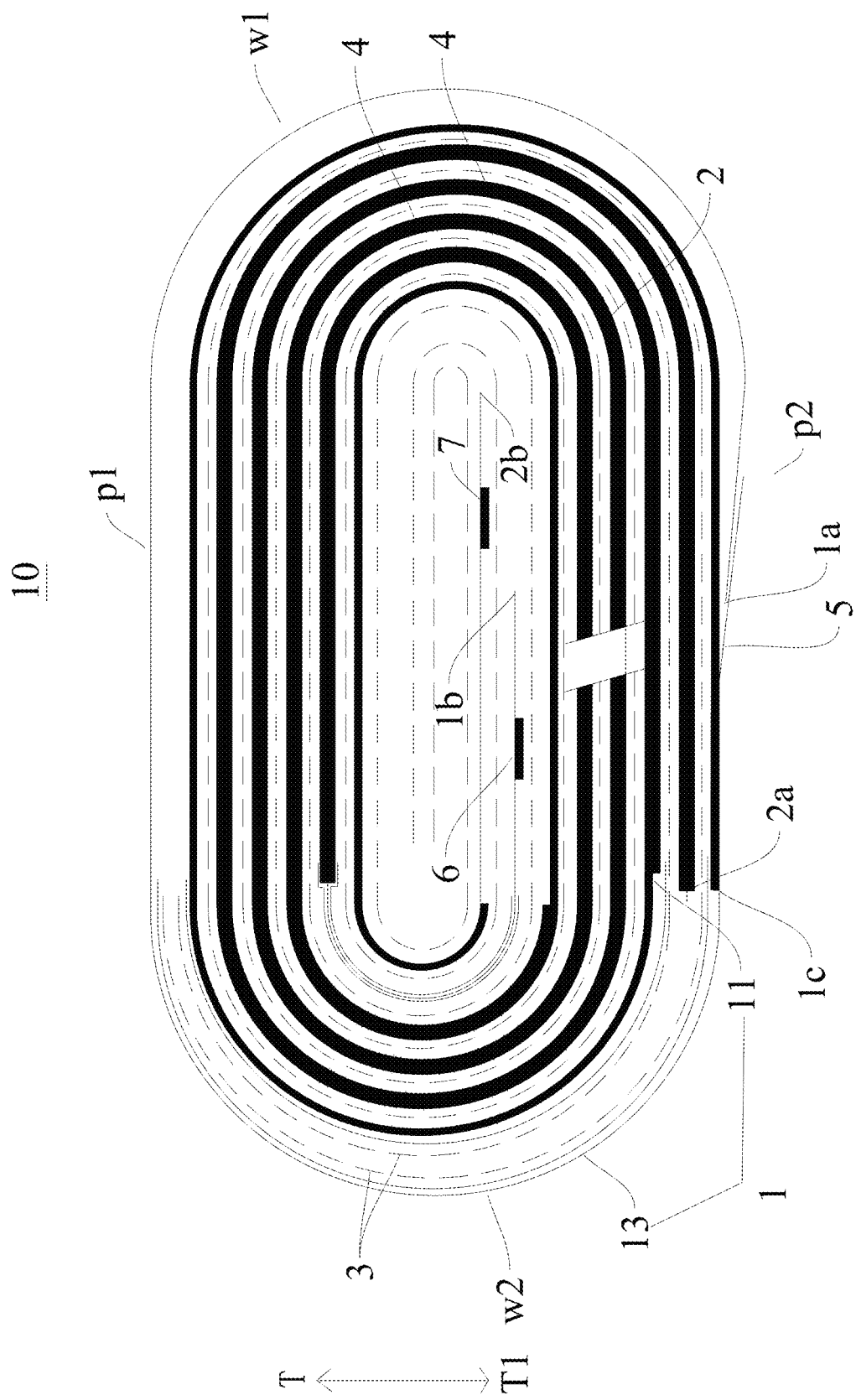
FIG. 2 illustrates a schematic view of a cell according to a second embodiment of the present disclosure.
Figure 3:
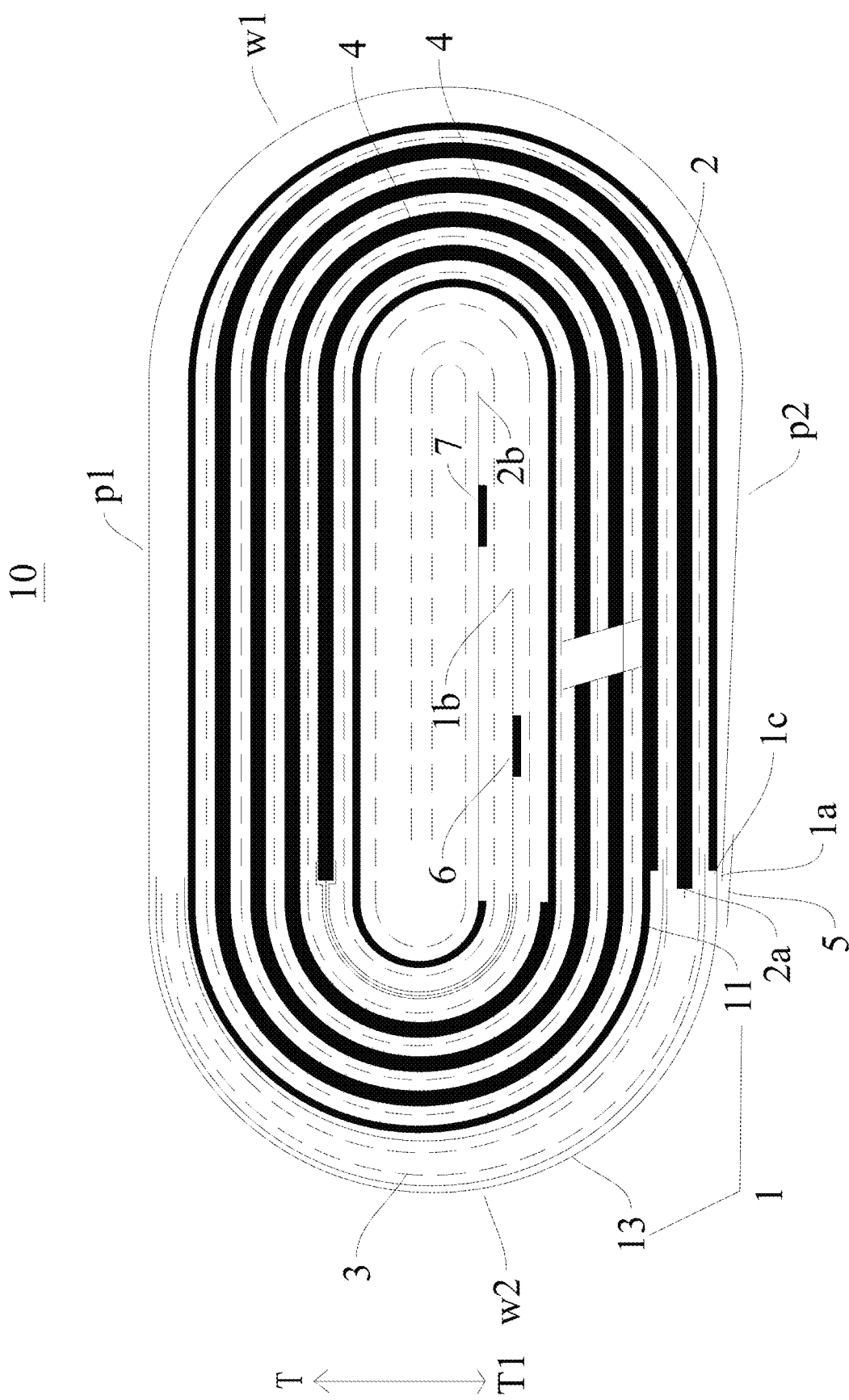
FIG. 3 illustrates a schematic view of a cell according to a third embodiment of the present disclosure.
Figure 4:
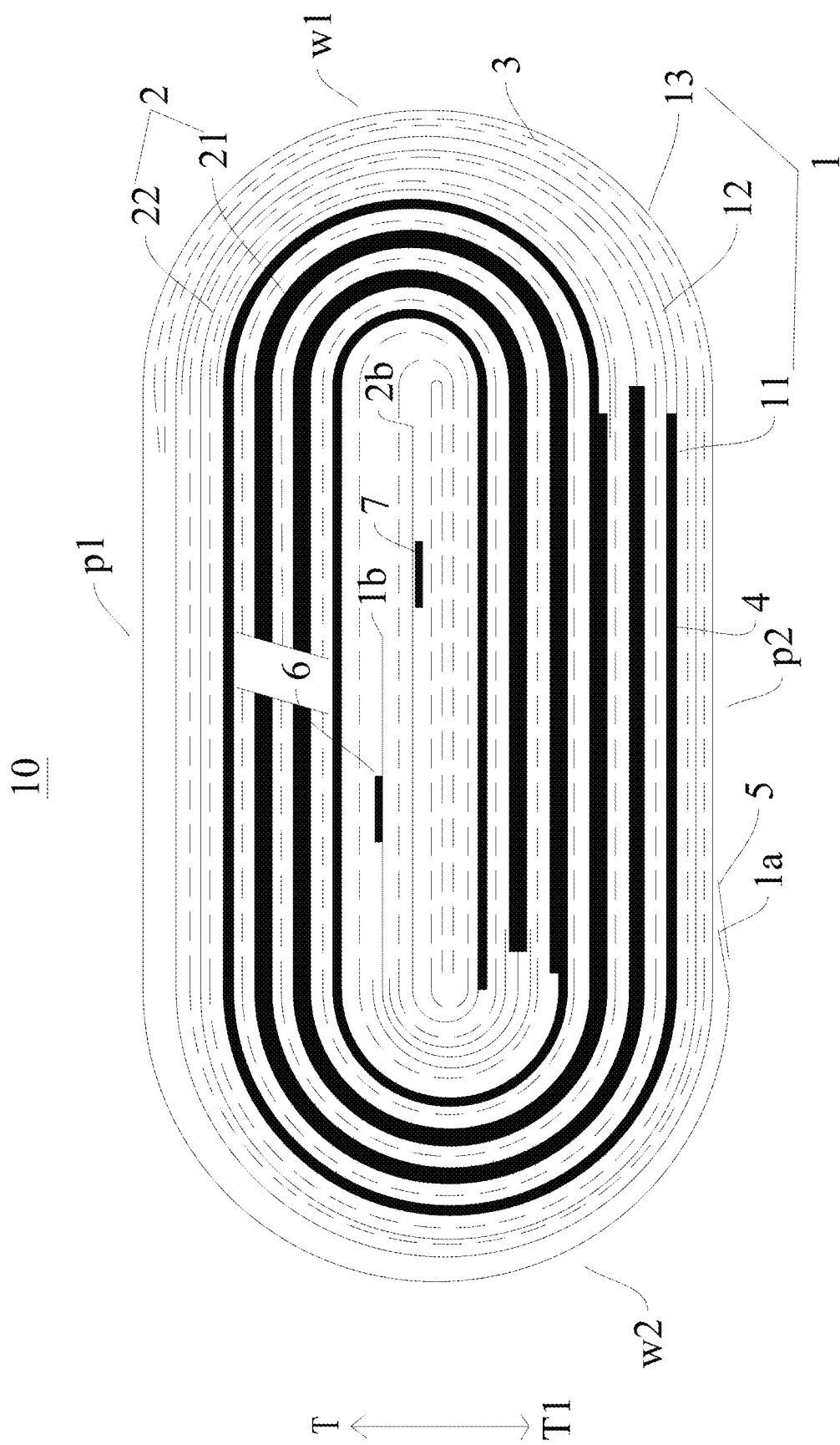
FIG. 4 illustrates a schematic view of a cell according to a fourth embodiment of the present disclosure.
Figure 5:
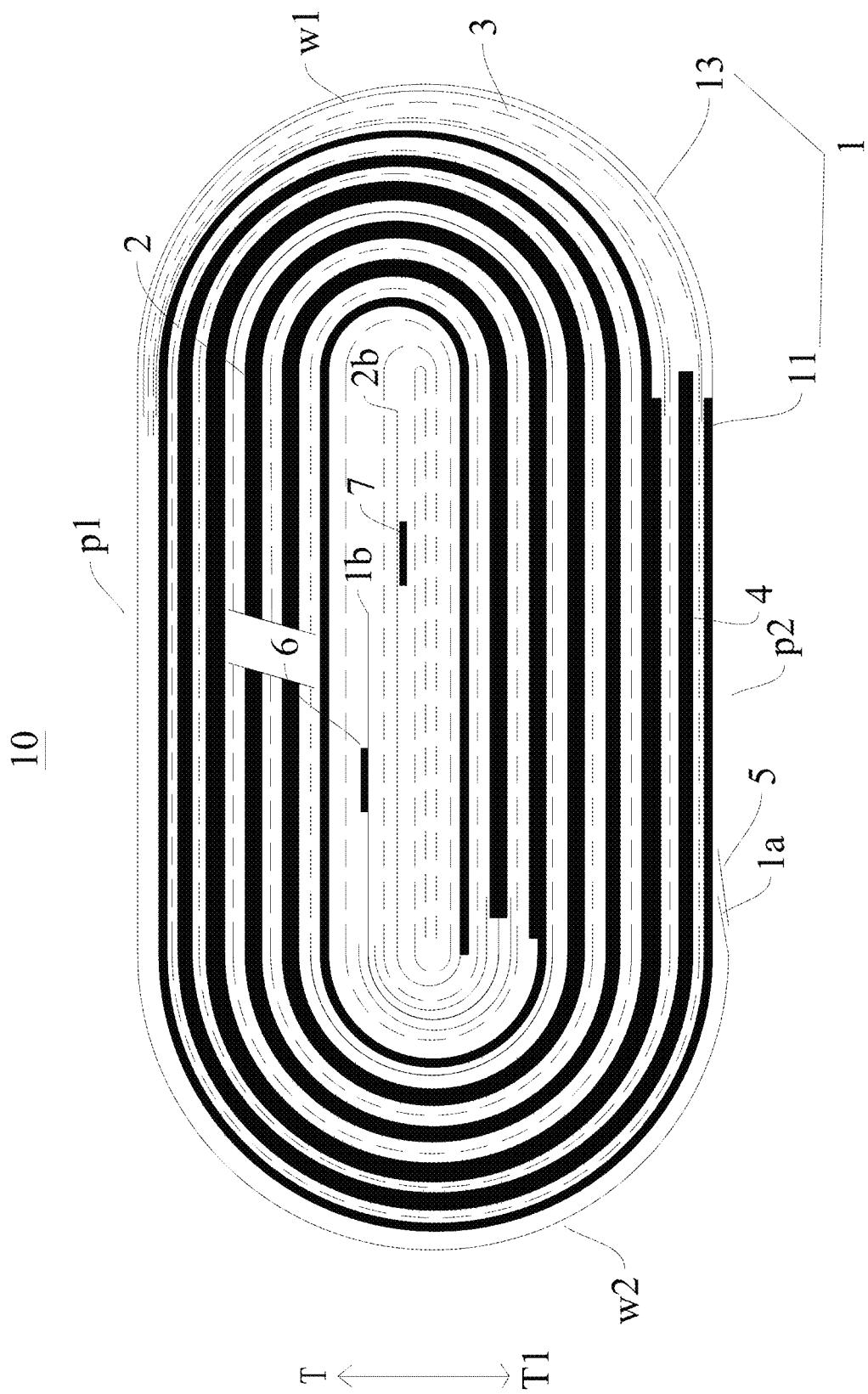
FIG. 5 illustrates a schematic view of a cell according to a fifth embodiment of the present disclosure.
Figure 6:
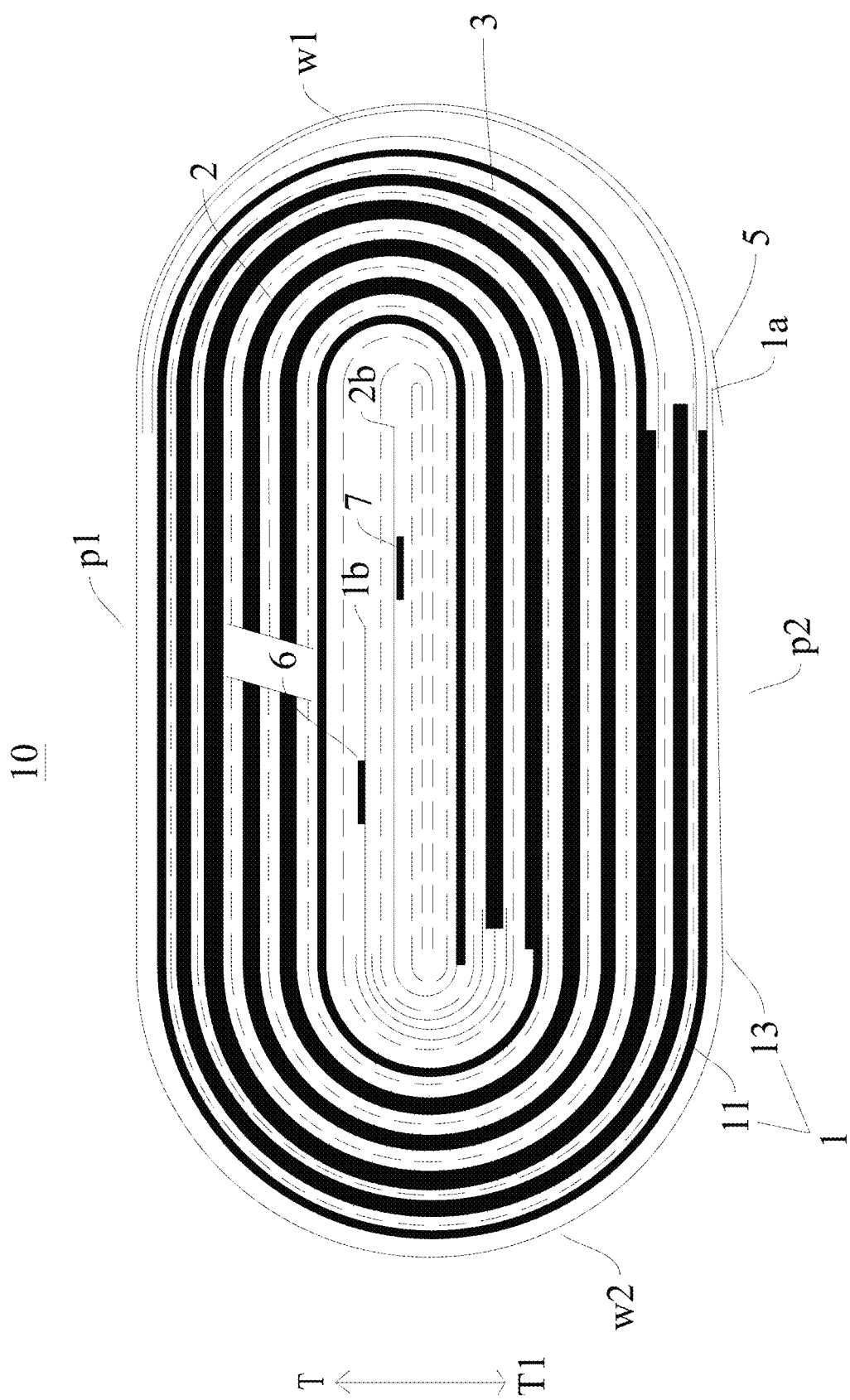
FIG. 6 illustrates a schematic view of a cell according to a sixth embodiment of the present disclosure.

As illustrated in FIGS. 1-7, the cell 10 according to embodiments of the present disclosure includes: a first current collector 1 and a second current collector 2. Along a winding direction, a tail end 1a of the first current collector 1 exceeds a tail end 2a of the second current collector 2 by at least half a circle. The winding direction of the cell 10 refers to a direction that a certain point in the schematic view of each cell shown in FIGS. 1-7 moves from the inside to the outside along the first current collector 1, the second current collector 2 or a separator 3. There are two kinds of winding directions, namely, clockwise winding and counterclockwise winding. As illustrated in FIGS. 1-3, and FIG. 7, the winding direction of each cell 10 is clockwise, and as illustrated in FIGS. 4-6, the winding direction of each cell 10 is counterclockwise.

One circle means starting from a certain point on the cell 10, which is considered as a starting end, running along the winding direction by one turn, and reaching another certain point which is taken as a finishing end. The finishing end, the starting end, and a center of the circle are on one straight line, and the starting end is between the finishing end and the center of the circle. Half circle is a half of the above one circle. For example, the cell 10 includes: a first straight segment p1, a first bent segment w1, a second straight segment p2, and a second bent segment w2. As illustrated in FIGS. 1-7, the first straight segment p1 and the second straight segment p2 are parts of the cell 10 parallel to a horizontal direction, the first straight segment p1 is on an upper side of the center of the cell 10, and the second straight segment p2 is on a lower side of the center of the cell 10. The first bent segment w1 and the second bent segment w2 are parts of the cell 10 parallel to a vertical direction, the first bent segment w1 is on a left side of the center of the cell 10, and the second bent segment w2 is on a right side of the center of the cell 10.

The half circle generally includes a combination of any one straight segment and any one bent segment, for example, the combination of the first straight segment p1 and the first bent segment w1, or the combination of the first bent segment w1 and the second straight segment p2. During the winding of the cell 10, each of the first current collector 1 and the second current collector 2 will form a starting end and a tail end. The starting end is usually located inside the cell 10 and the tail end is usually located outside the cell 10.

The first current collector 1 may be a cathode current collector while the second current collector 2 may be an anode current collector, and the material of a main body of the first current collector 1 is aluminum while the material of a main body of the second current collector 2 is copper. Alternatively, the first current collector 1 is an anode current collector while the second current collector 2 is a cathode current collector, and the material of the main body of the first current collector 1 is copper while the material of the main body of the second current collector is aluminum. The first current collector 1 and the second current collector 2 provided in this way may simplify the arrangement of the cell 10.

It should be noted that, the tail end of the traditional first current collector also exceeds the tail end of the second current collector by a certain length, but the length is far less than the length of half a circle of the cell. Consequently, there exists one problem that the tail end of the first current collector will be torn due to special circumstances, and then if an interior layer is also torn, the first current collector and the second current collector will contact and be short-circuited, resulting in low safety of the cell.

Moreover, in the related art, the packaging bag 20 and the cell are bonded by glue, which plays a role of fixing the cell to a certain extent, but the viscosity of the glue may lead to the tearing of the tail end 1a of the first current collector 1 to a certain extent when the cell is dropped. Those skilled in the related art considered starting with the properties of the glue, but failed to achieve better results.

In addition, in the related art, the development trend of cells lies in small volume and large capacity. The lengthening of the first current collector 1 will result in an increase in the thickness of the cell 10, so those skilled in the related art avoid increasing the length of the current collector. The inventor of the present application finds that if the length of the first current collector 1 is increased and the tail end 1a of the first current collector 1 exceeds the tail end 2a of the second current collector 2 by at least half a circle, the following situation will occur: the outermost circle of the cell 10 is the first current collector 1, the secondary outer circle of the cell 10 is still the first current collector 1, and the next secondary outer circle of the cell 10 is the second current collector 2, such that both the outermost circle and the secondary outer circle of the cell 10 are the first current collector 1. In such a way, even if the tail end 1a of the first current collector 1 is torn, the contact between the outermost circle and the secondary outer circle of the first current collector 1 will not lead to short circuits, in which the contact is essentially between the same polarities.

Thus, in the cell 10 according to embodiments of the present disclosure, by properly setting the length of the first current collector 1, even if the tail end 1a of the first current collector 1 is torn, the contact between the outermost circle and the secondary outer circle of the first current collector 1 will not lead to short circuits.

The tail end 1a or the first current collector 1 exceeds the tail end 2a of the second current collector 2 by half a circle to by one circle. For example, as illustrated in FIGS. 1, 2, 5 and 7, the tail end 1a of the first current collector 1 exceeds the tail end 2a of the second current collector 2 by three quarters of one circle; or as illustrated in FIGS. 3 and 6, the tail end 1a of the first current collector 1 exceeds the tail end 2a of the second current collector 2 by one circle; or as illustrated in FIG. 4, the tail end 1a of the first current collector 1 exceeds the tail end 2a of the second current collector 2 by half a circle. The thicknesses of the first current collector 1 and the second current collector 2 provided in this way are increased less, and the short circuit problem may be avoided.

Optionally, as illustrated in FIG. 1, the tail end 1a of the first current collector 1 abuts on an outer peripheral surface of the secondary outer circle of the first current collector 1. Thus, the outermost circle of the first current collector 1 and the secondary outer circle of the first current collector 1 directly abut against each other, such that the overall structure of the cell 10 is reliable and the short circuit between the first current collector 1 and the second current collector 2 may be effectively avoided.

Specifically, as illustrated in FIGS. 1-7, the cell 10 also includes: a separator 3 spaced between the first current collector 1 and the second current collector 2. Along the winding direction, a tail end of the separator 3 is located between the tail end 1a of the first current collector 1 and the tail end 2a of the second current collector 2. That is, along the winding direction, the tail end of the separator 3 exceeds the tail end 2a of the second current collector 2, and the tail end 1a of the first current collector 1 exceeds the tail end of the separator 3. Thus, the separator 3 can effectively isolate the first current collector 1 from the second current collector 2 along the winding direction, such that the contact between the first current collector 1 and the second current collector 2 may be effectively prevented, and the short circuit may be avoided.

Further, the tail end 1a of the first current collector 1 exceeds the tail end of the separator 3 by at least half a circle. For example, as illustrated in FIGS. 1, 2, 4, 5 and 7, the tail end 1a of the first current collector 1 exceeds the tail end of the separator 3 by half a circle; or as illustrated in FIG. 3, the tail end 1a of the first current collector 1 exceeds the tail end of the separator 3 by three quarters of a circle; or as illustrated in FIG. 6, the tail end 1a of the first current collector 1 exceeds the tail end of the separator 3 by one circle. In such a way, there is a sufficient safety distance between the first current collector 1 and the second current collector 2, thereby improving the safety of the cell.

In addition, the tail end 1a of the first current collector 1 is located at the first straight segment p1 or the second straight segment p2. In other words, the tail end 1a of the first current collector 1 is located at one straight segment, such that the tail end 1a of the first current collector 1 is easy to arrange and fix, which may help to improve the overall reliability.

Figure 8:
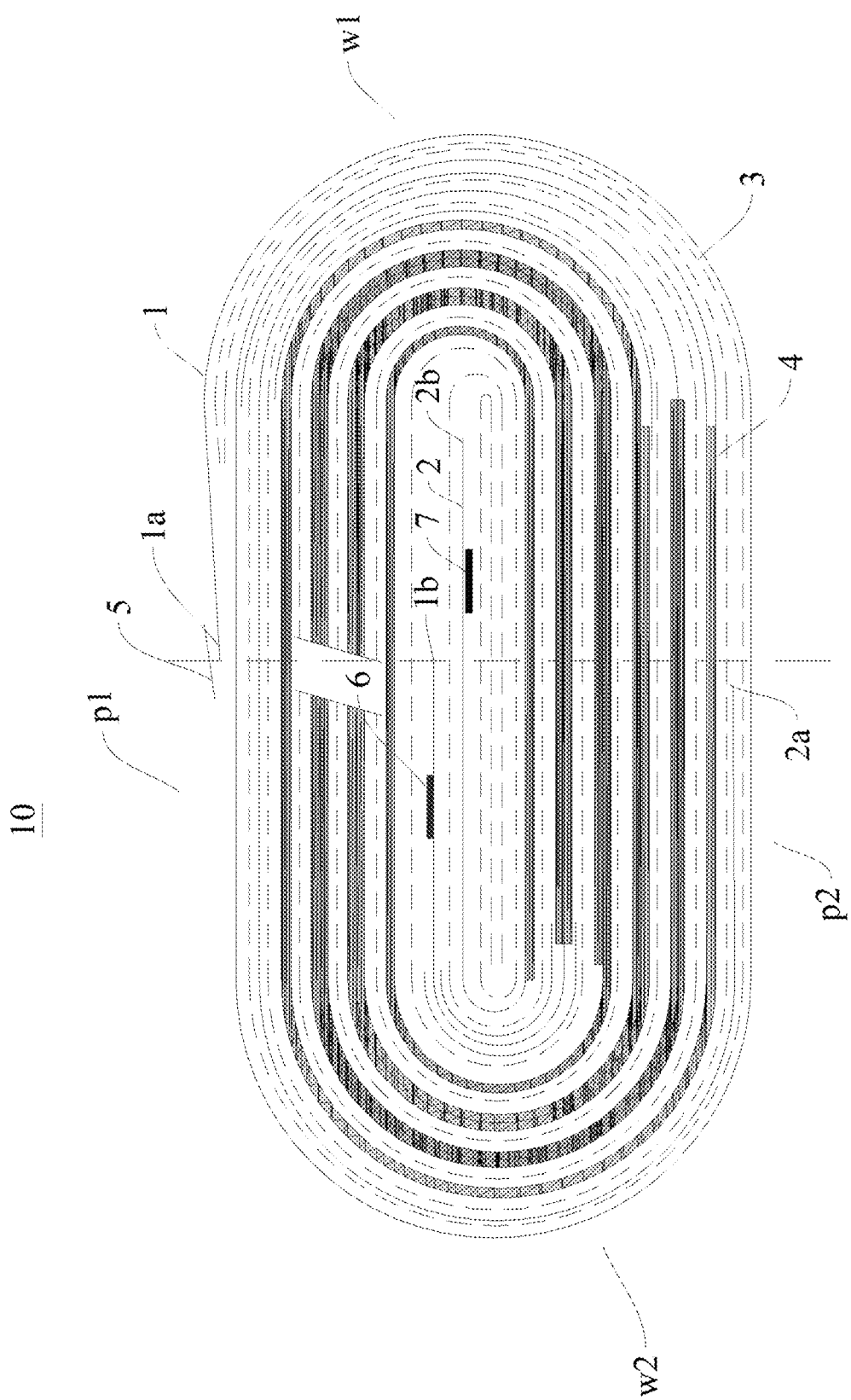
FIG. 8 illustrates a schematic view of a cell according to an eighth embodiment of the present disclosure.
Figure 9:
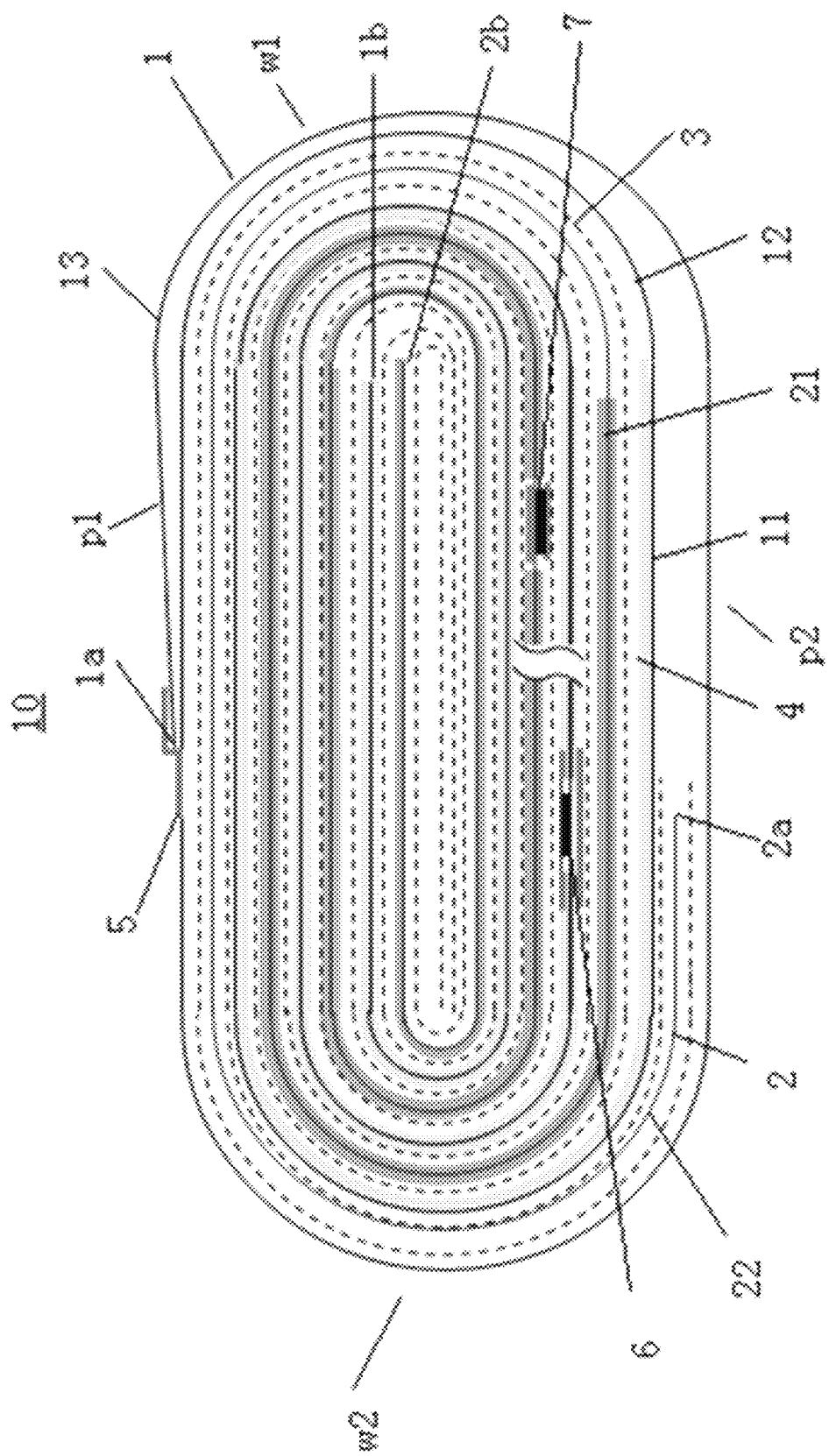
FIG. 9 illustrates a schematic view of a cell according to a ninth embodiment of the present disclosure.

The tail end 1a of the first current collector 1 and the tail end 2a of the second current collector 2 have different arrangements. For example, as illustrated in FIGS. 1-7, the tail end 1a of the first current collector 1 and the tail end 2a of the second current collector 2 are both located on the first straight segment p1 or the second straight segment p2. For another example, as illustrated in FIGS. 8 and 9, the tail end 1a of the first current collector 1 is located on the first straight segment p1 or the second straight segment p2, the tail end 2a of the second current collector 2 is located on the first straight segment p1 or the second straight segment p2, and the tail end 1a of the first current collector 1 and the tail end 2a of the second current collector 2 are located on both sides of the cell 10 respectively. In other words, the tail end 1a of the first current collector 1 and the tail end 2a of the second current collector 2 may be arranged on different segments. When the tail end 1a of the first current collector 1 is located on the first straight segment p1, the tail end 2a of the second current collector 2 is located on the second straight segment p2; and when the tail end 2a of the second current collector 2 is located on the first straight segment p1, the tail end 1a of the first current collector 1 is located on the second straight segment p2. Thus, by properly setting the positions of the tail end 1a of the first current collector 1 and the tail end 2a of the second current collector 2, the tail end 1a of the first current collector 1 and the tail end 2a of the second current collector 2 may be flat and stable, and the overall thickness of the cell 10 is suitable.

The cell 10 formed by winding the first current collector 1 and the second current collector 2 differently will be correspondingly described below.

According to an optional embodiment of the present disclosure, the first current collector includes: a first active material layer section 11, a first bare foil section 12 and a finishing section 13 that are successively connected. A free end of the finishing section 13 is a tail end 1a. A surface of the first bare foil section 12 is not provided with an active material layer 4. The active material layer 4 is a first active material layer, and a surface of the first active material layer section 11 is provided with the first active material layer thereon. The first active material layer may be disposed on both sides or may be disposed on a single side.

The finishing section 13 has a length of at least half a circle, and the connection point between the finishing section 13 and the first bare foil section 12 is denoted by point c1. The second current collector 2 includes: a second active material layer section 21 and a second bare foil section 22 that are successively connected. A surface of the second bare foil section 22 is not provided with an active material layer 4, and the active material layer 4 is a second active material layer. The first active material layer and the second active material layer may be the same or may be different. A surface of the second active material layer section 21 is provided with the second active material layer thereon.

The cell 10 includes an opposite region of the bare foil sections, and in the opposite region, a partial area of the first bare foil section 12 faces the second bare foil section 22. In other words, the second bare foil section 22 corresponds to the first bare foil section 12 along the winding direction. That is, the finishing section 13 is a part of the first current collector 1 exceeding the second current collector 2. Thus, by properly setting the length of the finishing section 13, the tail end 1a of the first current collector 1 may exceed the tail end 2a of the second current collector 2 by at least half a circle. Hence, through the correspondence between the first bare foil section 12 and the second bare foil section 22, a bare foil region may be formed in the cell 10, that is the opposite region of the bare foil sections, and a surface of the current collector in the bare foil region is not provided with the active material layer 4. The bare foil region may enhance the use safety of the cell 10.

Specifically, the first bare foil section 12 and the second bare foil section 22 are of the same length, and the first bare foil section 12 has a length of half a circle to one circle. As illustrated in FIGS. 1, 2, 4, and 7, the lengths of the first bare foil section 12 and the second bare foil section 22 may be one circle. Certainly, the lengths of the first bare foil section 12 and the second bare foil section 22 may also be half a circle, three quarters of one circle, one and a half circle, and the like. The first bare foil section 12 and the second bare foil section 22 provided in this way can make the overall length of the bare foil region suitable, which may help to ensure the use safety of the cell 10.

According to another optional embodiment of the present disclosure, as illustrated in FIGS. 3, 5 and 6, the first current collector 1 includes: a first active material layer section 11 and a finishing section 13 that are successively connected. A surface of the first active material layer section 11 is provided with an active material layer 4. The finishing section 13 has a length of at least half a circle. A surface of the second current collector 2 is provided with the active material layer 4, and the active material layer 4 extends to the tail end 2a of the second current collector 2. Compared to the above embodiments, each of the first current collector 1 and the second current collector 2 in this present embodiment omits the bare foil section, such that the structure of the cell 10 is compact and the arrangement is simple.

Along the winding direction, on the first current collector 1, a region from a starting end 1b of the first current collector 1 to a first bend (where the first current collector is bent for the first time) of the first current collector 1 is a starting section 14 of the first current collector 1. Along a direction opposite to the winding direction, on the second current collector 2, a region from a tail end 2a of the second current collector 2 to an initial bend (where the second current collector is bent initially) of the second current collector 2 is an outer circle straight section 23 of the second current collector 2. A projection of the straight section 14 of the first current collector 1 on the horizontal plane does not overlap a projection of the outer circle straight section 23 of the second current collector 2 on the horizontal plane. That is, when the whole cell 10 is disposed on the horizontal plane, the starting end 1b of the first current collector 1 and the tail end 2a of the second current collector 2 will not intersect with each other, and at most the two are adjacent to each other, such that it is beneficial to the reduction of the overall thickness of the cell 10, so as to avoid increasing the thickness of the cell 10.

It also should be noted that, as for the fixing manner of the tail end 1a of the first current collector 1, in the present disclosure, the tail end 1a of the first current collector 1 is bonded on an outer peripheral surface of the outermost circle of the first current collector 1 by a first adhesive 5. The usage of the first adhesive 5 cannot only make the tail end 1a of the first current collector 1 finish simply and reliably, but also reduce the cost of the cell 10. Of course, there are many options for the first adhesive 5. For example, the first adhesive 5 may be at least one of a single-sided tape, a double-sided tape and a hot melt adhesive. Any one of the above adhesives 5 can effectively bond the tail end 1a of the first current collector 1 on the secondary outer circle of the first current collector 1, and the adhesion effect is good.

Figure 12:
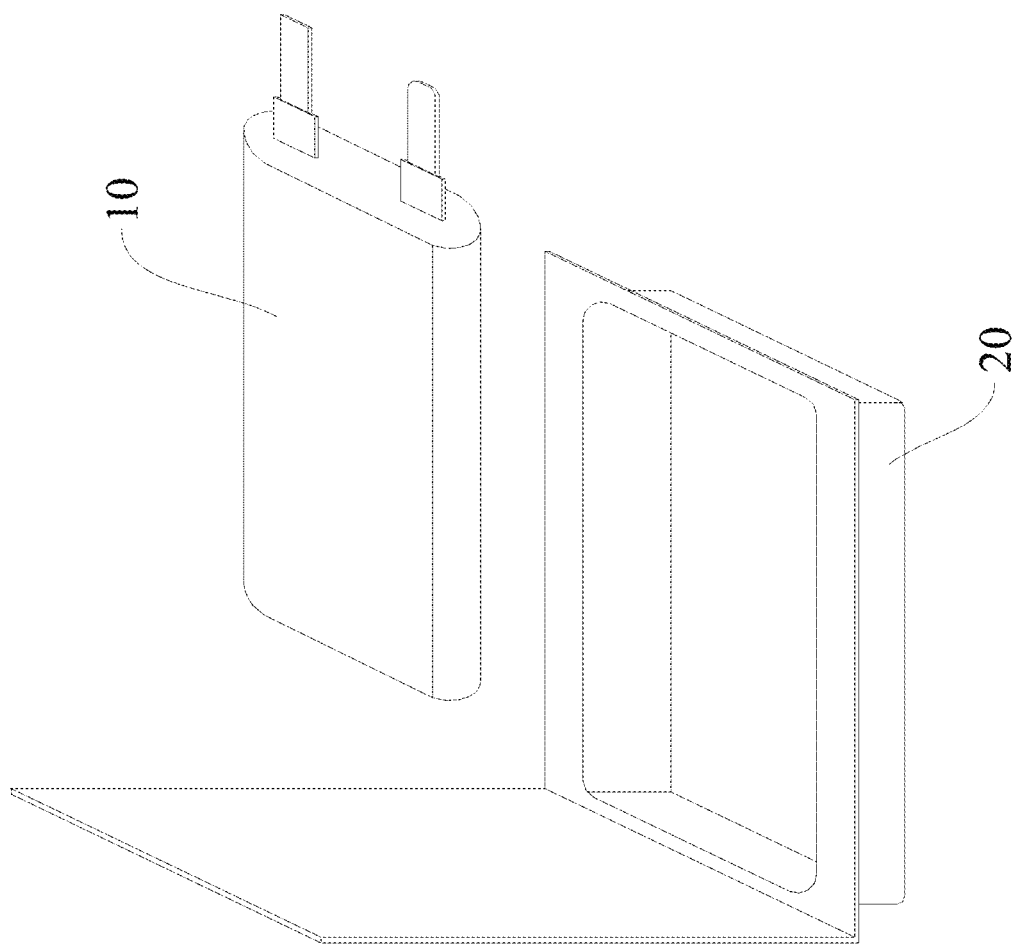
FIG. 12 illustrates a schematic view of a cell and a packaging bag according to an embodiment of the present disclosure.

For example, as illustrated in FIGS. 2 and 12, the first adhesive 5 may be a double-sided tape or a hot melt adhesive. The first adhesive 5 is also used to bond a packaging bag 20. In other words, the first adhesive 5 cannot only bond the tail end 1a of the first current collector 1, but also bond the packaging bag 20, such that the first adhesive 5 can be used in two ways, and hence the cost may be further saved.

Figure 7:
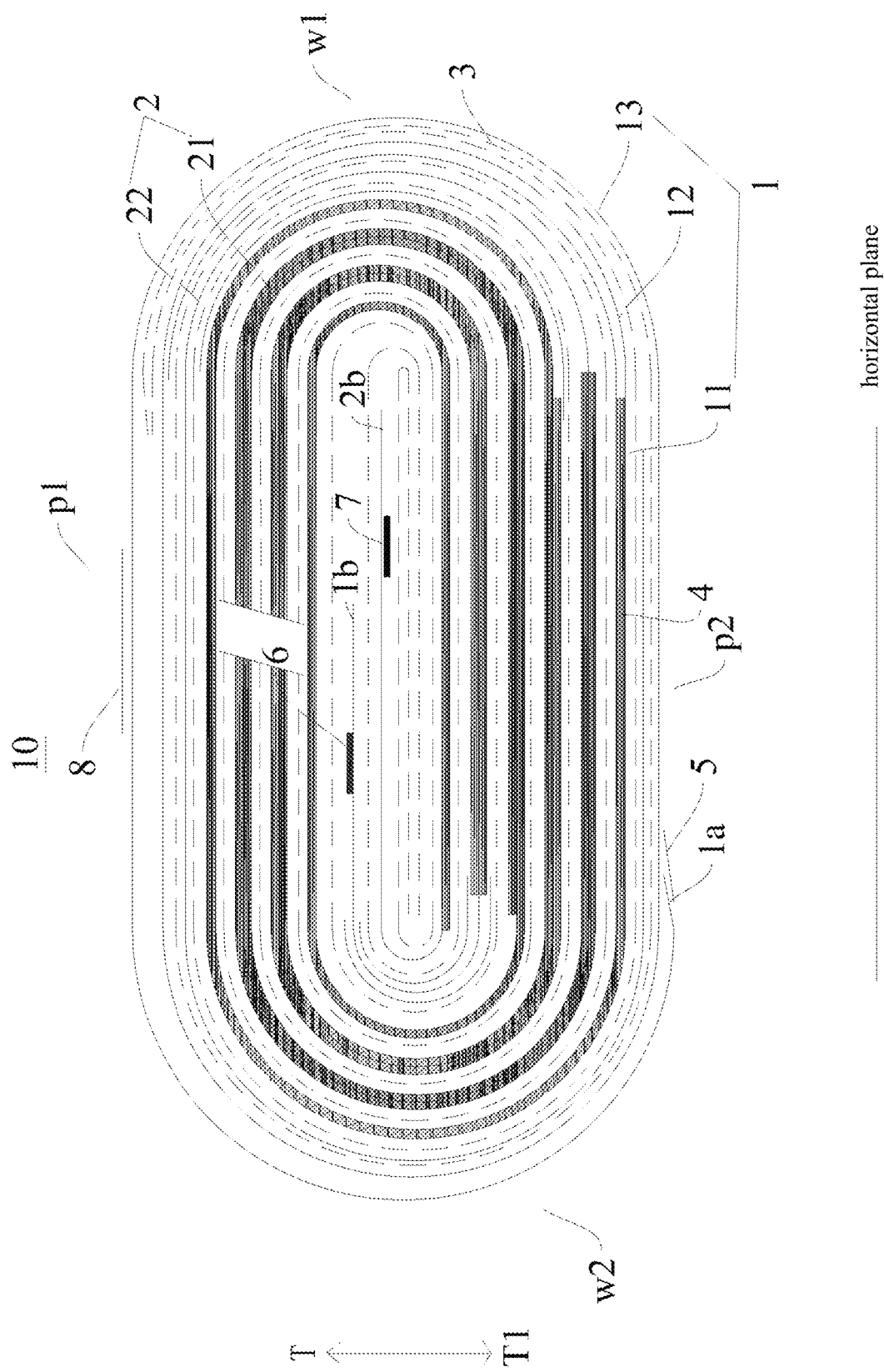
FIG. 7 illustrates a schematic view of a cell according to a seventh embodiment of the present disclosure.

For another example, as illustrated in FIG. 7, the first adhesive 5 is a single-sided tape. The cell 10 is bonded with a double-sided tape or a hot melt adhesive on the other side away from the tail end 1a of the first current collector 1, and the double-sided tape or the hot melt adhesive is used as a second adhesive 8 and is also used to bond the packaging bag 20. Thus, by separating the first adhesive 5 for bonding the tail end 1a of the first current collector 1 from the second adhesive 8, the two can be prevented from interfering with each other, which is beneficial to the adhesion stability between the cell 10 and the packaging bag 20.

Figure 10:
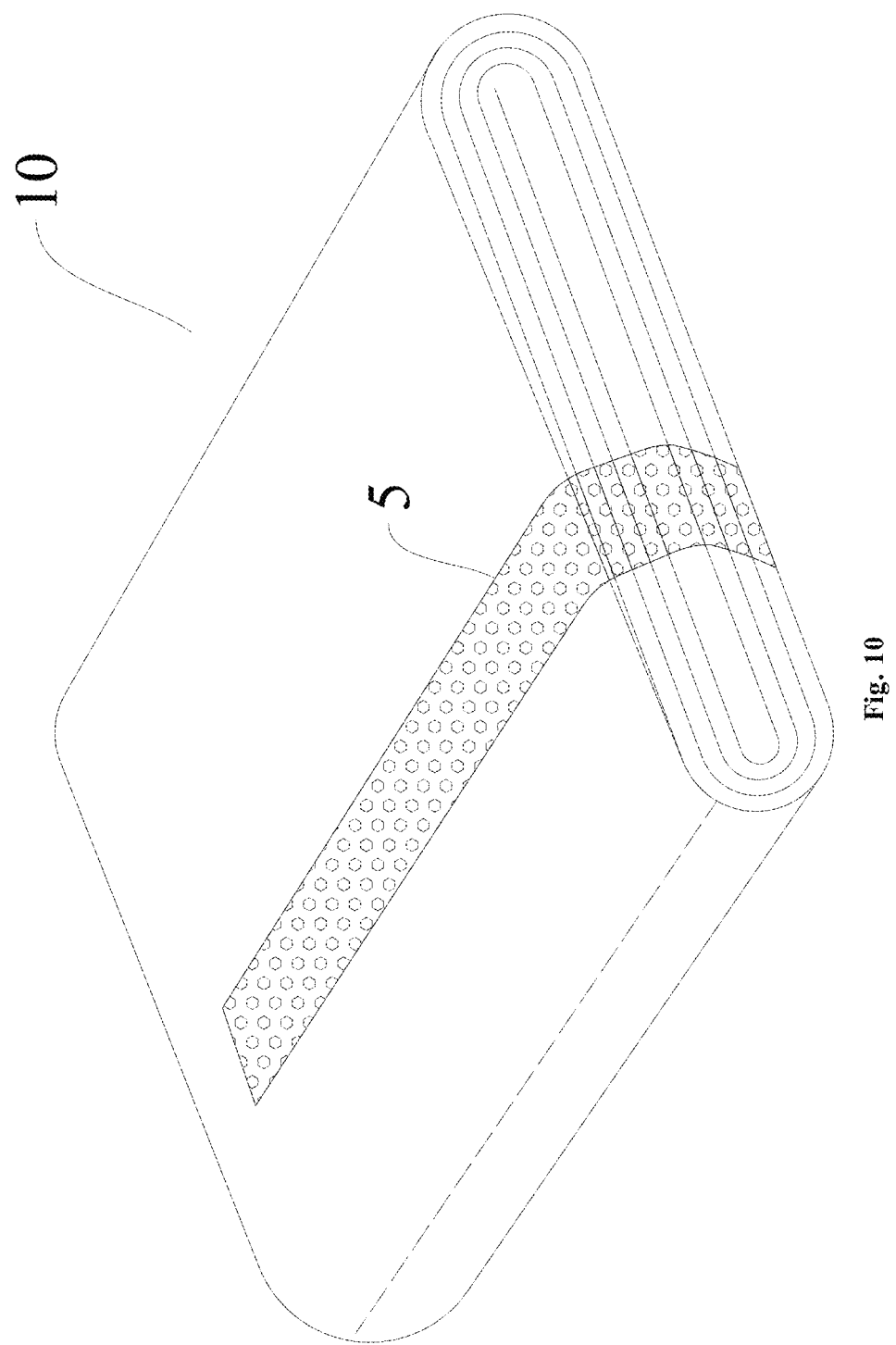
FIG. 10 illustrates a perspective view of a cell according to an embodiment of the present disclosure from a first angle.
Figure 11:
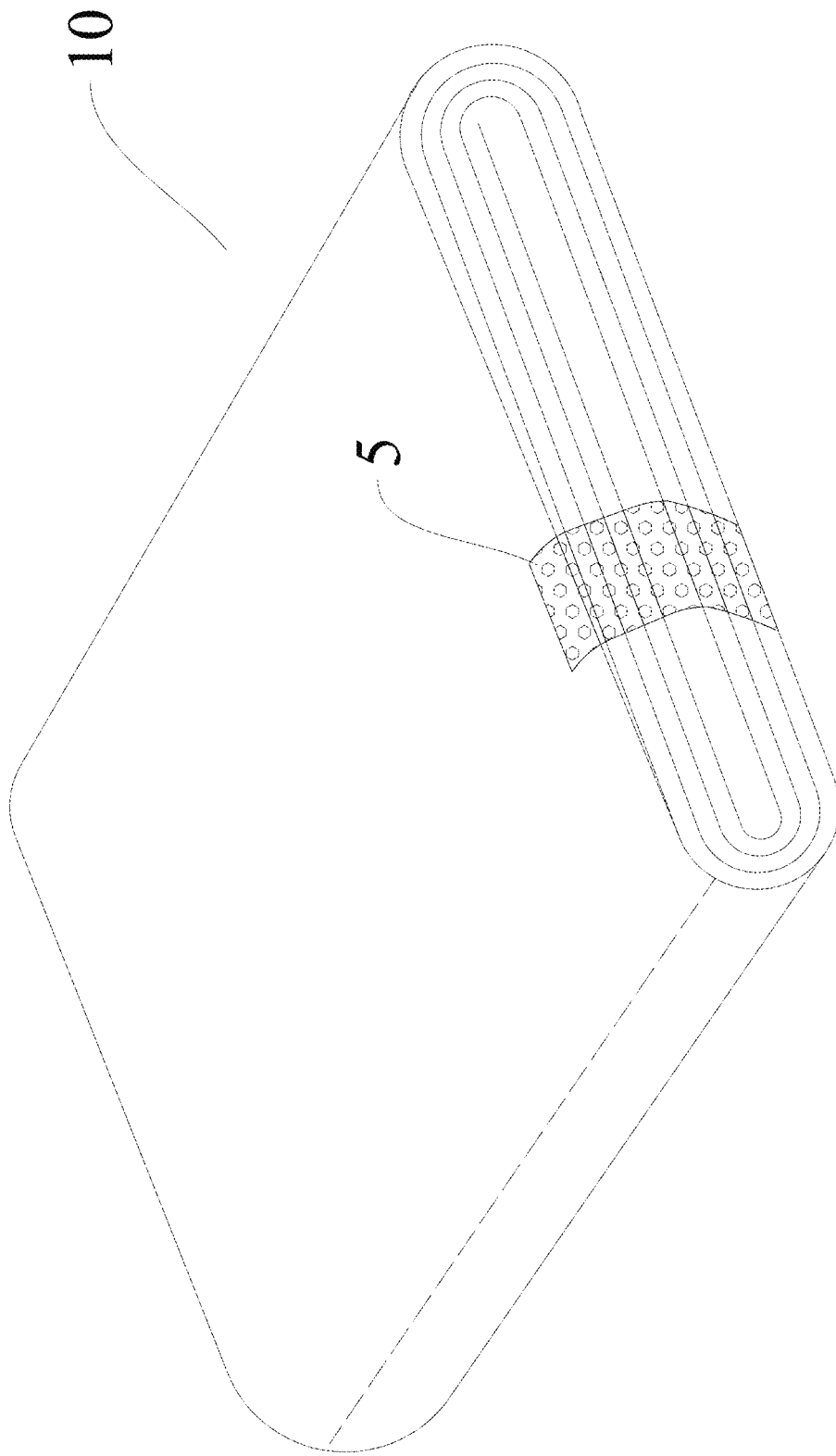
FIG. 11 illustrates a perspective view of a cell according to an embodiment of the present disclosure from a second angle.

As illustrated in FIGS. 10 and 11, the first adhesive 5 needs to be bonded on two opposite surfaces of the cell 10. Specifically, the first adhesive 5 also bends and extends to the other side away from the tail end of the first current collector 1, and for example, extends to the other side away from the tail end of the first current collector 1 by 0 to 20 mm. Thus, the first adhesive 5 may improve the overall reliability of the cell 10.

In addition, as illustrated in FIGS. 3-6, the cell 10 also includes: a first electrode tab 6 and a second electrode tab 7. The first electrode tab 6 is electrically connected with the first current collector 1, and the second electrode tab 7 is electrically connected with the second current collector 2. The projections of the first electrode tab 6 and the first adhesive 5 on the horizontal plane do not overlap, or the projections of the second electrode tab 7 and the first adhesive 5 on the horizontal plane do not overlap. In such an arrangement of the first electrode tab 6, the second electrode tab 7 and the first adhesive 5, the thickness of the cell 10 may be reduced.

Reference throughout this specification to terms "one embodiment," "some embodiments," "an illustrative embodiment," "an example," "a specific example," or "some examples" means that a particular feature, structure, material, or characteristic described in connection with the embodiment or example is included in at least one embodiment or example of the present disclosure. In this specification, the appearances of the aforesaid terms are not necessarily referring to the same embodiment or example. Moreover, the particular features, structures, materials, or characteristics described can be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure. The scope of this disclosure is defined by the claims and their equivalents.

What is claimed is:

1. A cell, comprising:
    a first current collector and a second current collector;
    along a winding direction, a tail end of the first current collector exceeding a tail end of the second current collector by at least half a circle;
    wherein the tail end of the first current collector does not include an active material;
    the tail end of the first current collector is bonded on an outer peripheral surface of an outermost circle of the first current collector by a first adhesive, the first adhesive is a double-sided tape or a hot melt adhesive;
    the cell is bonded with another double-sided tape or another hot melt adhesive on a side opposite from the tail end of the first current collector.

2. The cell according to claim 1, wherein the tail end of the first current collector exceeds the tail end of the second current collector by half a circle to by one circle.

3. The cell according to claim 1, wherein the tail end of the first current collector abuts on an outer peripheral surface of a secondary outer circle of the first current collector.

4. The cell according to claim 1, further comprising: a separator spaced between the first current collector and the second current collector, along the winding direction, a tail end of the separator being located between the tail end of the first current collector and the tail end of the second current collector.

5. The cell according to claim 4, wherein the tail end of the first current collector exceeds the tail end of the separator by at least half a circle.

6. The cell according to claim 1, comprising: a first straight segment, a first bent segment, a second straight segment, and a second bent segment, the tail end of the first current collector being located on the first straight segment or the second straight segment.

7. The cell according to claim 6, wherein the tail end of the first current collector and the tail end of the second current collector are both located on the first straight segment or the second straight segment.

8. The cell according to claim 6, wherein the tail end of the first current collector is located on one of the first straight segment and the second straight segment, the tail end of the second current collector is located on the other one of the first straight segment and the second straight segment, and the tail end of the first current collector and the tail end of the second current collector are located on both sides of the cell respectively.

9. The cell according to claim 1, wherein the first current collector comprises: a first active material layer section, a first bare foil section and a finishing section that are successively connected, a surface of the first bare foil section is not provided with a first active material layer, a surface of the first active material layer section is provided with the first active material layer, and the finishing section has a length of at least half a circle;
    the second current collector comprises: a second active material layer section and a second bare foil section that are successively connected, a surface of the second active material layer section is provided with a second active material layer, and a surface of the second bare foil section is not provided with the second active material layer;
    the cell comprises an opposite region of the bare foil sections, and in the opposite region, a partial area of the first bare foil section and the second bare foil section face each other.

10. The cell according to claim 9, wherein the opposite region of the first bare foil section has a length of half a circle to one circle.

11. The cell according to claim 1, wherein the first current collector comprises: a first active material layer section and a finishing section that are successively connected, a surface of the first active material layer section is provided with an active material layer, and the finishing section has a length of at least half a circle;
    a surface of the second current collector is provided with an active material layer, and the active material layer extends to the tail end of the second current collector.

12. The cell according to claim 1, wherein along the winding direction, on the first current collector, a region from a starting end of the first current collector to a first bend where the first current collector is bent for the first time is a starting section of the first current collector;
    along a direction opposite to the winding direction, on the second current collector, a region from the tail end of the second current collector to an initial bend where the second current collector is bent initially is an outer circle straight section of the second current collector;
    projections of the starting section of the first current collector and the outer circle straight section of the second current collector on the horizontal plane do not overlap.

13. The cell according to claim 1, wherein the first adhesive is used to bond a packaging bag.

14. The cell according to claim 1, wherein the another double-sided tape or the another hot melt adhesive is used to bond a packaging bag.

15. The cell according to claim 1, wherein the first adhesive further bends and extends to an other side of the cell away from the tail end of the first current collector.

16. The cell according to claim 1, further comprising: a first electrode tab and a second electrode tab, wherein the first electrode tab is electrically connected with the first current collector, the second electrode tab is electrically connected with the second current collector, and projections of the first electrode tab and the first adhesive on the horizontal plane do not overlap, or projections of the second electrode tab and the first adhesive on the horizontal plane do not overlap.

17. The cell according to claim 1, wherein the first current collector is a cathode current collector, and the second current collector is an anode current collector; the material of a main body of the first current collector is aluminum, and the material of a main body of the second current collector is copper.

18. The cell according to claim 1, wherein the first current collector is an anode current collector, and the second current collector is a cathode current collector; the material of a main body of the first current collector is copper, and the material of a main body of the second current collector is aluminum.

* * * * *